(12) United States Patent
Harvey et al.

(10) Patent No.: US 9,505,566 B2
(45) Date of Patent: Nov. 29, 2016

(54) POWDER FEEDER METHOD AND SYSTEM

(71) Applicant: NATIONAL RESEARCH COUNCIL OF CANADA, Ottawa (CA)

(72) Inventors: Bernard Harvey, Ste-Julie (CA); Eric Irissou, Longueuil (CA); Jean-Gabriel Legoux, Repentigny (CA); Rogerio Soares Lima, Boucherville (CA); Jean-Claude Tremblay, Mercier (CA); Eric Gagnon, St-Jean-sur-Richelieu (CA); Sylvain Desaulniers, Candiac (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 19 days.

(21) Appl. No.: 14/242,940

(22) Filed: Apr. 2, 2014

(65) Prior Publication Data
US 2014/0294517 A1    Oct. 2, 2014

Related U.S. Application Data

(60) Provisional application No. 61/807,374, filed on Apr. 2, 2013.

(51) Int. Cl.
| | | |
|---|---|---|
| *B05B 7/00* | (2006.01) | |
| *B65G 53/22* | (2006.01) | |
| *B05B 7/14* | (2006.01) | |
| *C23C 24/04* | (2006.01) | |
| *C23C 4/12* | (2016.01) | |

(52) U.S. Cl.
CPC .............. *B65G 53/22* (2013.01); *B05B 7/1445* (2013.01); *B05B 7/1486* (2013.01); *C23C 4/11* (2016.01); *C23C 4/12* (2013.01); *C23C 24/04* (2013.01)

(58) Field of Classification Search
CPC ........................................................ B65D 53/22
USPC ......................................................... 222/630
See application file for complete search history.

(56) References Cited

U.S. PATENT DOCUMENTS

| | | | | |
|---|---|---|---|---|
| 902,577 | A * | 11/1908 | Hall .............................. | 99/513 |
| 3,841,530 | A * | 10/1974 | Janninck ................... | 222/189.04 |
| 3,987,937 | A * | 10/1976 | Coucher ..................... | 406/115 |
| 4,346,818 | A * | 8/1982 | Bosmiller ..................... | 222/58 |
| 4,576,526 | A * | 3/1986 | Muller et al. ................. | 406/75 |
| 4,730,647 | A * | 3/1988 | Mulder ......................... | 141/67 |
| 4,808,042 | A * | 2/1989 | Muehlberger et al. ........ | 406/66 |
| 4,900,199 | A * | 2/1990 | Spaulding et al. ............ | 406/14 |
| 4,924,058 | A * | 5/1990 | Johner ..................... | 219/121.47 |
| 4,997,318 | A * | 3/1991 | Kostecki et al. .............. | 406/66 |
| 5,209,607 | A * | 5/1993 | Wei et al. ..................... | 406/66 |
| 5,356,599 | A * | 10/1994 | Miura et al. ................. | 422/219 |

(Continued)

*Primary Examiner* — Kevin P Shaver
*Assistant Examiner* — Michael J Melaragno
(74) *Attorney, Agent, or Firm* — Gwendoline Bruneau

(57) ABSTRACT

A powder fluidizing system, comprising a pressure vessel, a powder container removably mounted within the pressure vessel, and comprising a bottom sieve; a vibrator generating vibrations and transmitting the vibrations to the powder container above the sieve; and a guide directly secured under said powder container to the bottom sieve; wherein a bulk powder fed within the powder container is vibrated within the powder container and flows through the sieve to the guide, and a powder fluidizing method, comprising feeding a bulk powder within a powder reservoir maintained under pressure; vibrating the powder reservoir; and passing the powder through a sieve positioned at the bottom of the powder reservoir.

17 Claims, 13 Drawing Sheets

(56) References Cited

U.S. PATENT DOCUMENTS

| | | | |
|---|---|---|---|
| 5,360,141 A * | 11/1994 | Scatizzi | 222/55 |
| 5,478,172 A * | 12/1995 | Oura et al. | 406/23 |
| 6,283,327 B1 * | 9/2001 | Rubtsov | 222/56 |
| 6,398,463 B1 * | 6/2002 | Morterol | 406/146 |
| 6,620,243 B1 * | 9/2003 | Bertellotti et al. | 118/621 |
| 6,651,843 B2 * | 11/2003 | Kowalsky et al. | 222/1 |
| 6,715,640 B2 * | 4/2004 | Tapphorn et al. | 222/52 |
| 7,232,543 B2 * | 6/2007 | Celikkaya et al. | 266/216 |
| 7,273,075 B2 * | 9/2007 | Tapphorn et al. | 141/2 |
| 7,891,527 B2 * | 2/2011 | Dentler et al. | 222/370 |
| 7,955,031 B2 * | 6/2011 | Powell et al. | 406/75 |
| 8,444,351 B2 * | 5/2013 | Volonte et al. | 406/24 |
| 2009/0032609 A1 * | 2/2009 | Ziesel | 239/10 |
| 2010/0310326 A1 * | 12/2010 | Sundholm | 406/85 |
| 2011/0058905 A1 * | 3/2011 | Hamel et al. | 406/138 |
| 2013/0011209 A1 * | 1/2013 | Doig | 406/15 |
| 2013/0092764 A1 * | 4/2013 | Fornaci et al. | 239/654 |
| 2014/0286714 A1 * | 9/2014 | Medoff et al. | 406/106 |

\* cited by examiner

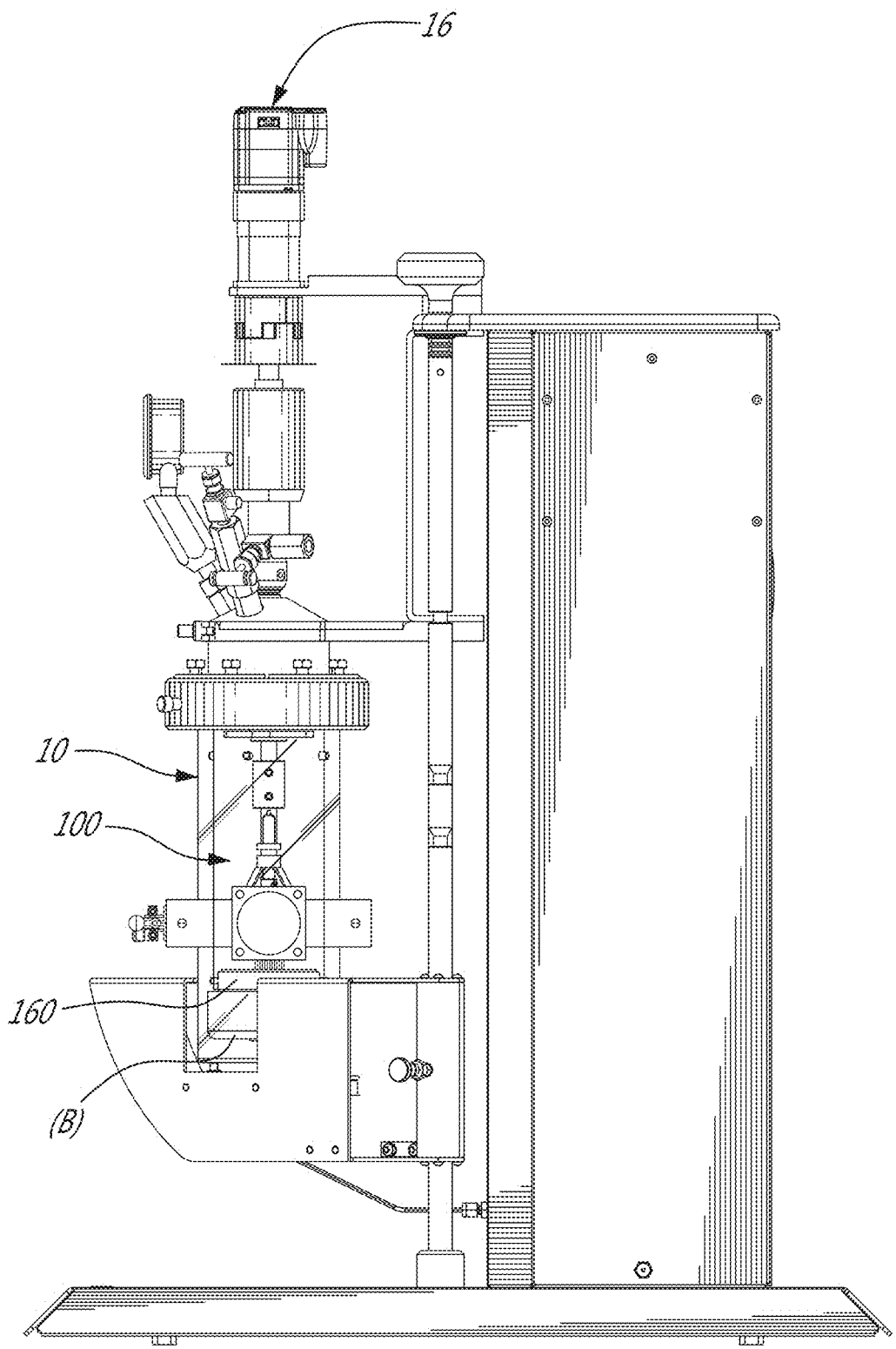

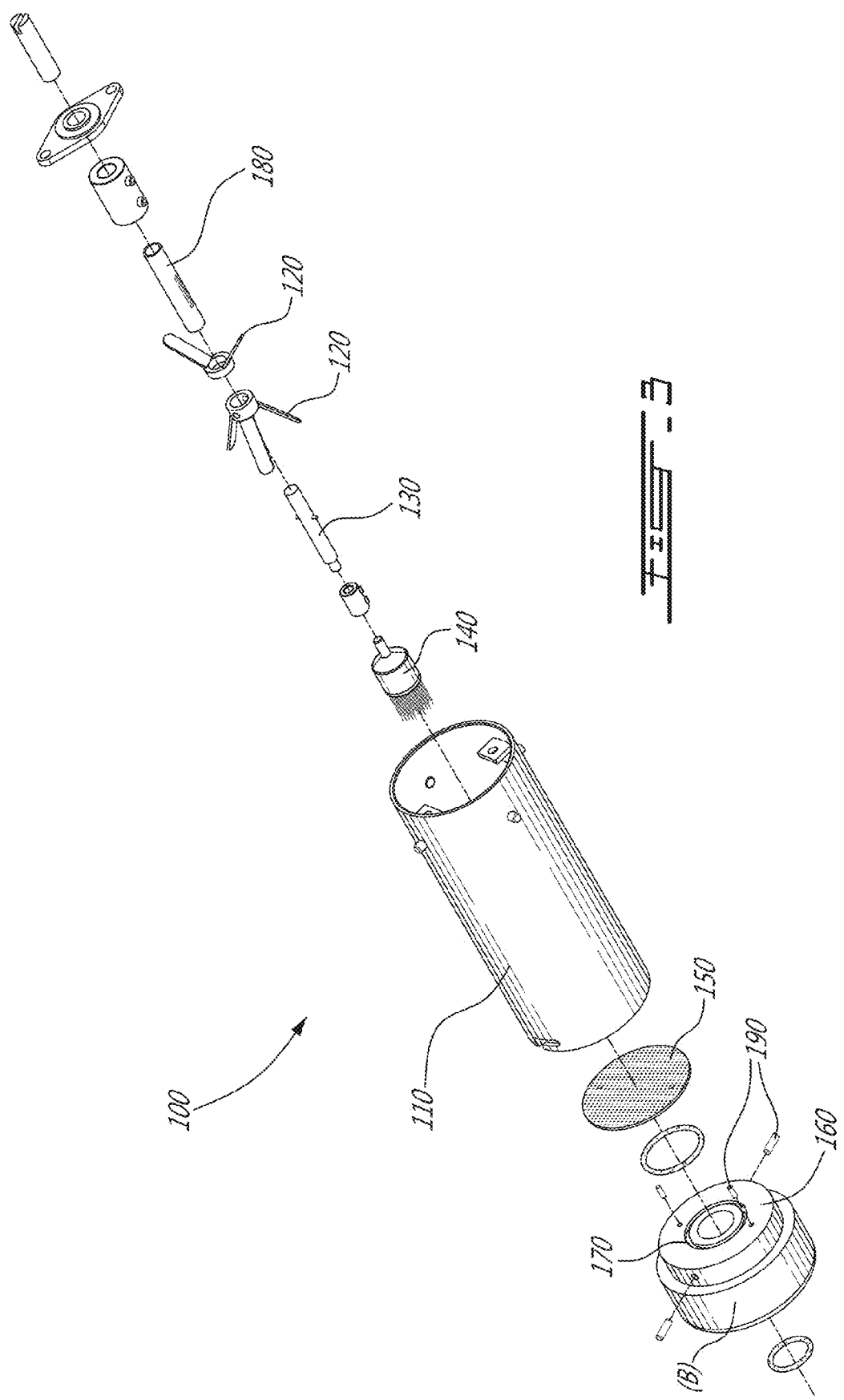

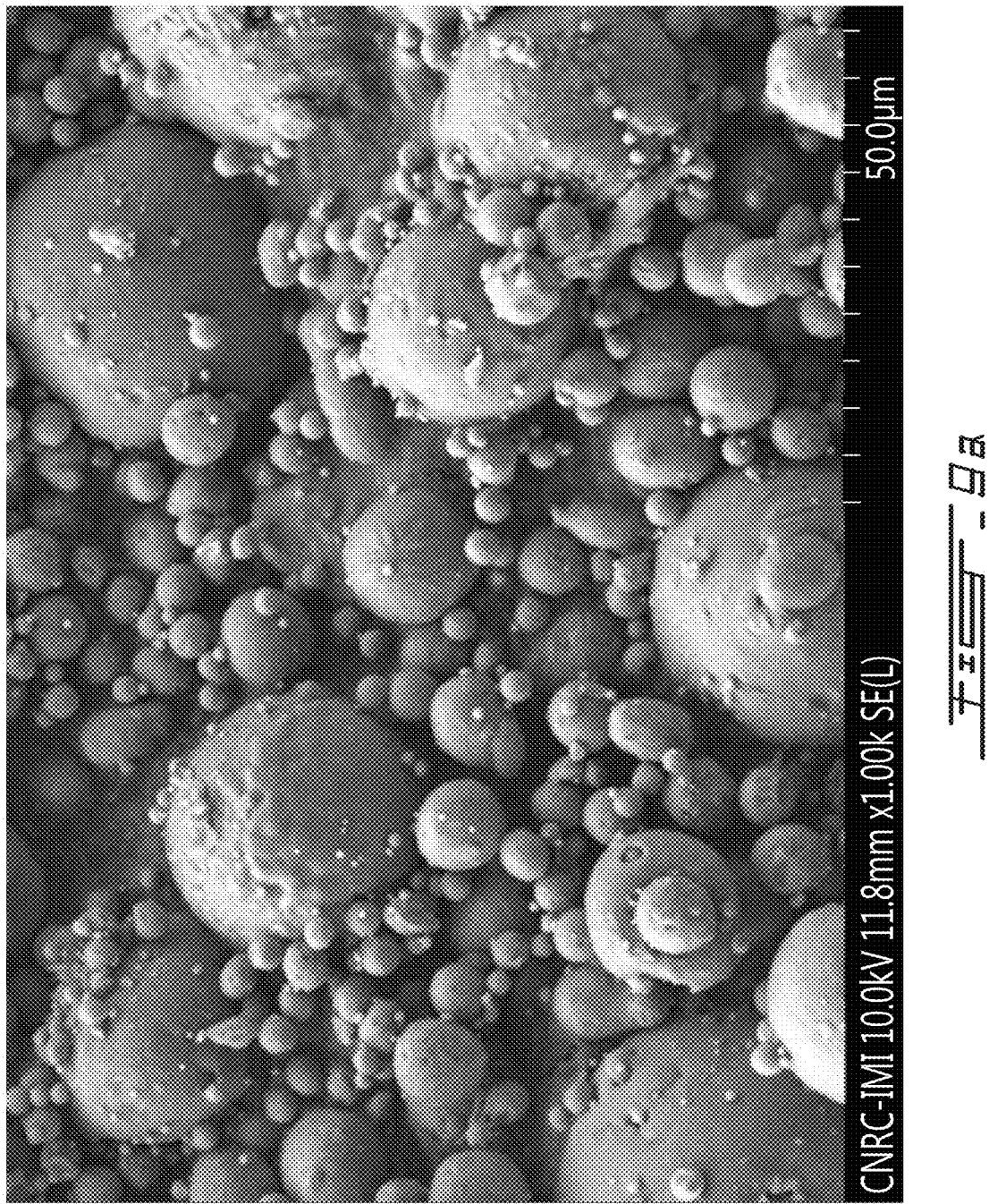

POWDER FEEDER METHOD AND SYSTEM

CROSS REFERENCE TO RELATED APPLICATIONS

This application claims benefit of U.S. provisional application Ser. No. 61/807,374, filed on Apr. 2, 2013. All documents above are incorporated herein in their entirety by reference.

FIELD OF THE INVENTION

The present invention relates to a powder feeder method and system.

BACKGROUND OF THE INVENTION

Cold spray processes and thermal spray processes, such as high velocity oxygen fuel spray processes (HVOF) or plasma spray for example, use fine powders. Available powder feeders may prove to be ill-adapted for dealing with fine powders, as fine powders are prone to clogging, agglomeration, accumulation on walls, and powder coagulation, in particular for HVOF processes, which tend to use finer and finer powders. For cold spray coating processes, in addition to the abovementioned problems, currently available powder feeders are typically limited in terms of operating pressures.

There is still a need in the art for a powder feeder method and system overcoming recurrent problems of the art.

SUMMARY OF THE INVENTION

More specifically, in accordance with the present invention, there is provided a powder fluidizing method, comprising feeding a bulk powder within a powder reservoir maintained under pressure; vibrating the powder reservoir; and passing the powder through a sieve positioned at the bottom of the powder reservoir.

There is further provided a powder fluidizing system, comprising a pressure vessel, a powder container removably mounted within the pressure vessel, and comprising a bottom sieve; a vibrator generating vibrations and transmitting the vibrations to the powder container above the sieve; and a guide directly secured under said powder container to the bottom sieve; wherein a bulk powder fed within the powder container is vibrated within the powder container and flows through the sieve.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 shows an exploded view of a powder reservoir according to an embodiment of an aspect of the present invention;

DESCRIPTION OF EMBODIMENTS OF THE INVENTION

Figure 1A:
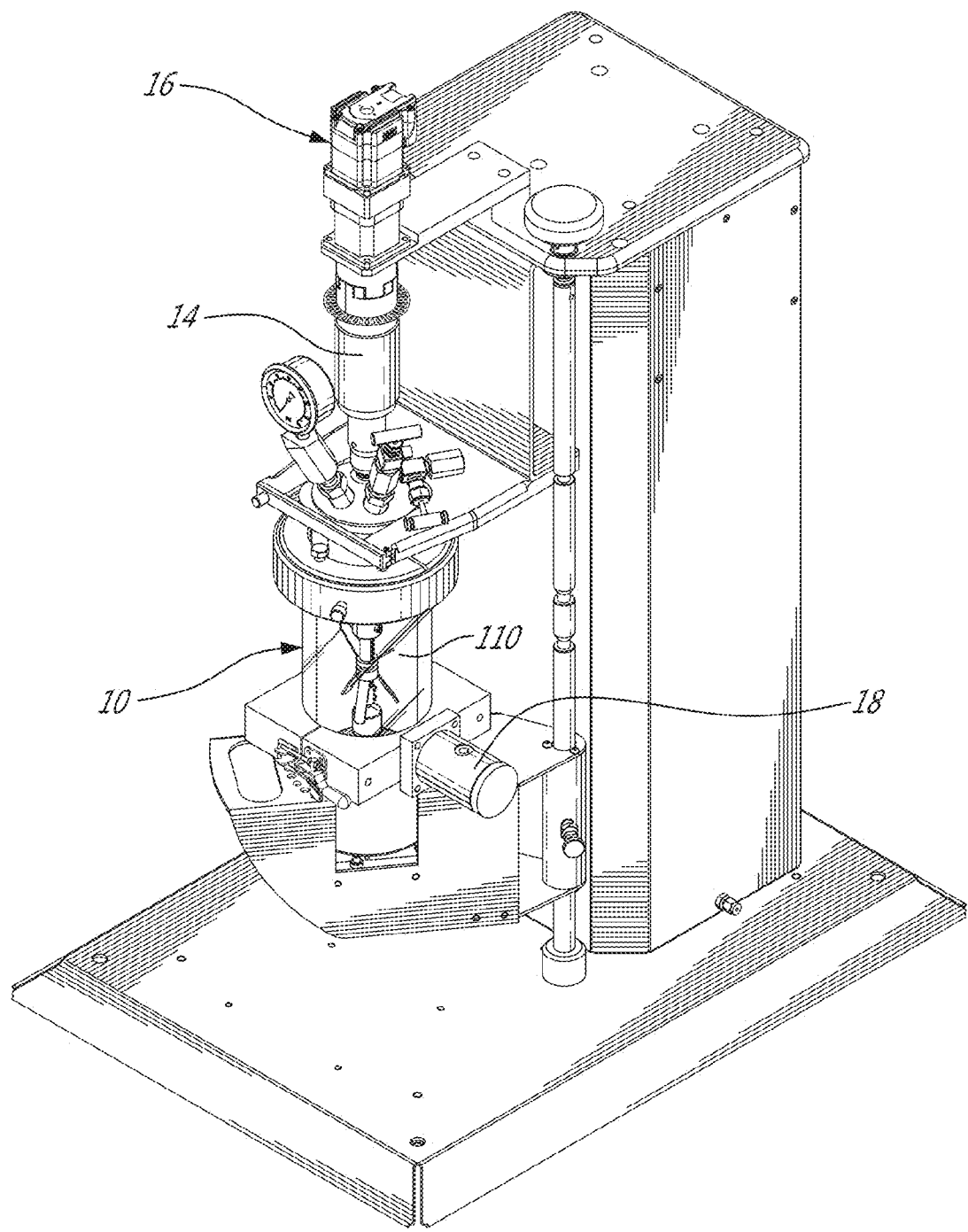
FIG. 1 show a) a perspective view and b) a side view, of a system according to an embodiment of an aspect of the present invention.
Figure 2A:
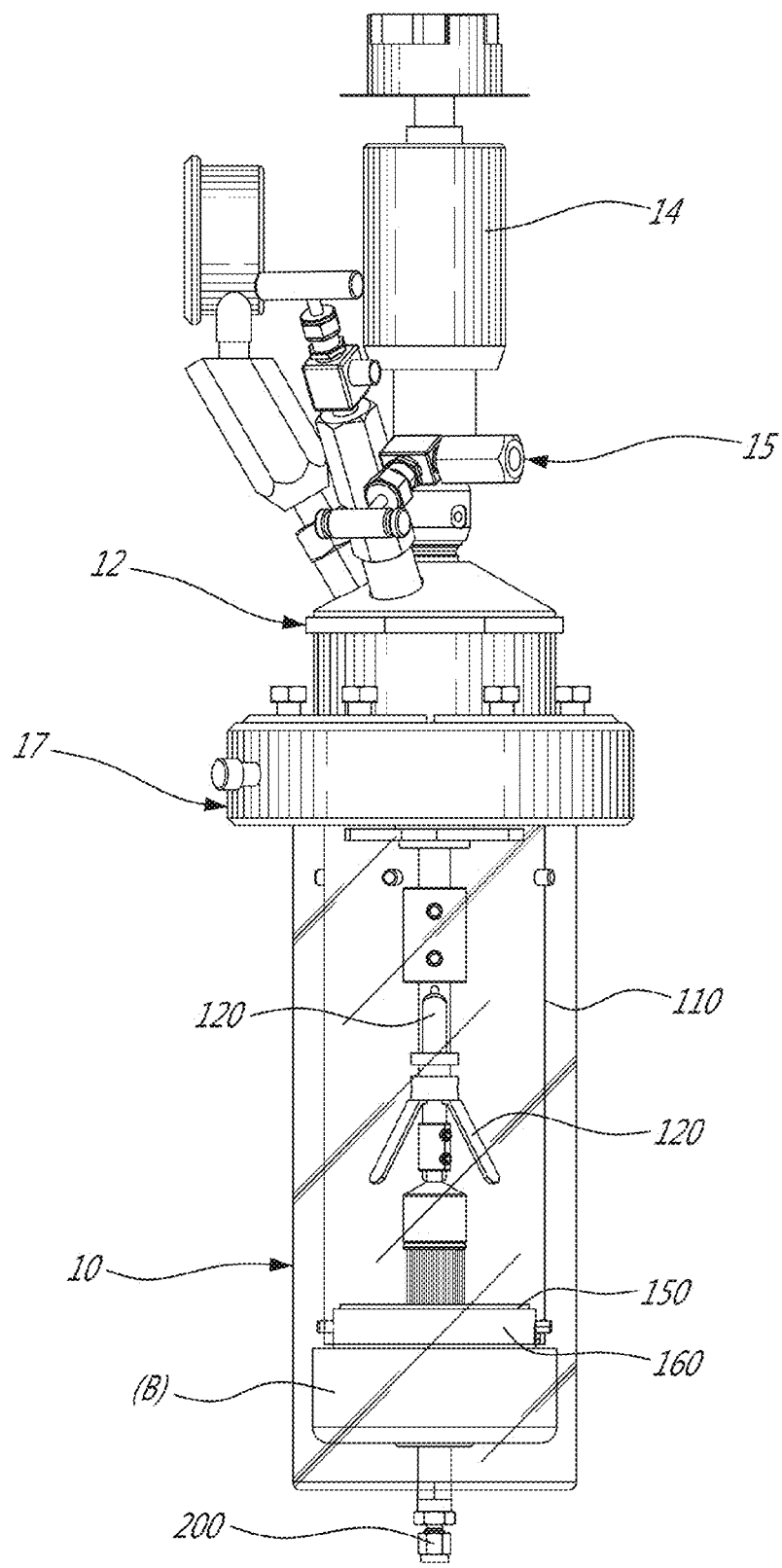
FIG. 2 show a) a first view and b) a second view, of a pressure vessel according to an embodiment of an aspect of the present invention.

As shown in FIGS. 1 to 3, a powder fluidizing system according to an embodiment of an aspect of the present invention comprises a pressure vessel 10 and a powder reservoir 100.

The pressure vessel 10 is a vessel made with a fixed head 12, hermetically sealed by split ring cover clamp sections 17 that can be unclamped to open the pressure vessel 10, and comprising an inert gas entry port 15. The pressure vessel 10 allows pressures up to 131 bars.

The pressure vessel 10 receives, axially mounted therein about a shaft 130, the powder reservoir 100. The shaft 130 is powered by a magnetic drive 14 and a motor 16, for rotation about the center axis of the pressure vessel 10.

As best seen in FIG. 3, the powder reservoir 100 comprises an elongated cylindrical powder container 110. As illustrated in FIG. 3, multiple positioning pins 190 and a spring-loaded mechanism 180 for example may be used to ensure adequate mounting of the powder container 110 about the central axial shaft 130 within the pressure vessel 10.

At least one stir spindle 120 is mounted on the axial shaft 130. It is found that multiple stir spindles mounted at a different height on the axial shaft 130 and with different orientations, i.e. some oriented upwards and some oriented downwards, increase efficiency of fluidization of the powder by increasing stirring, i.e. movements, of the powder within the powder container 110.

Figure 2B:
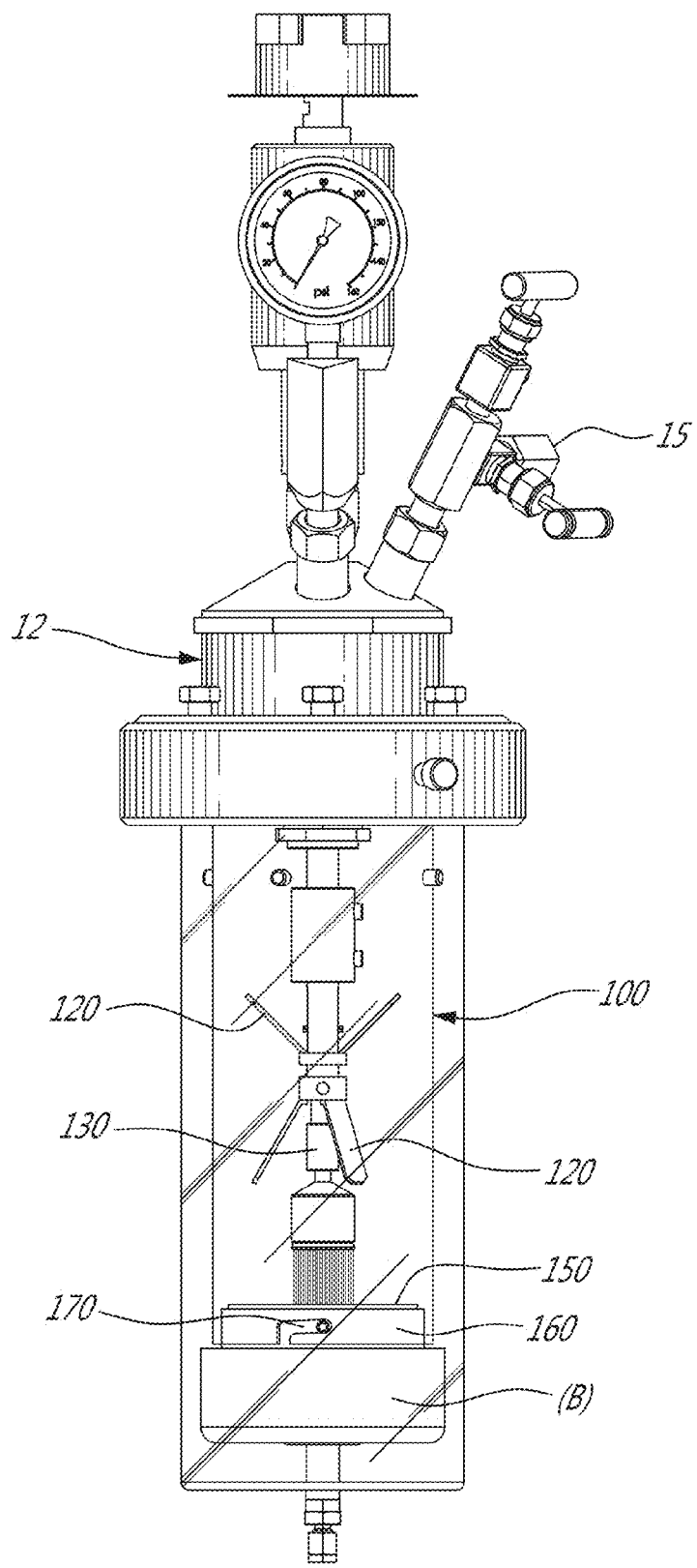
Figure 4:
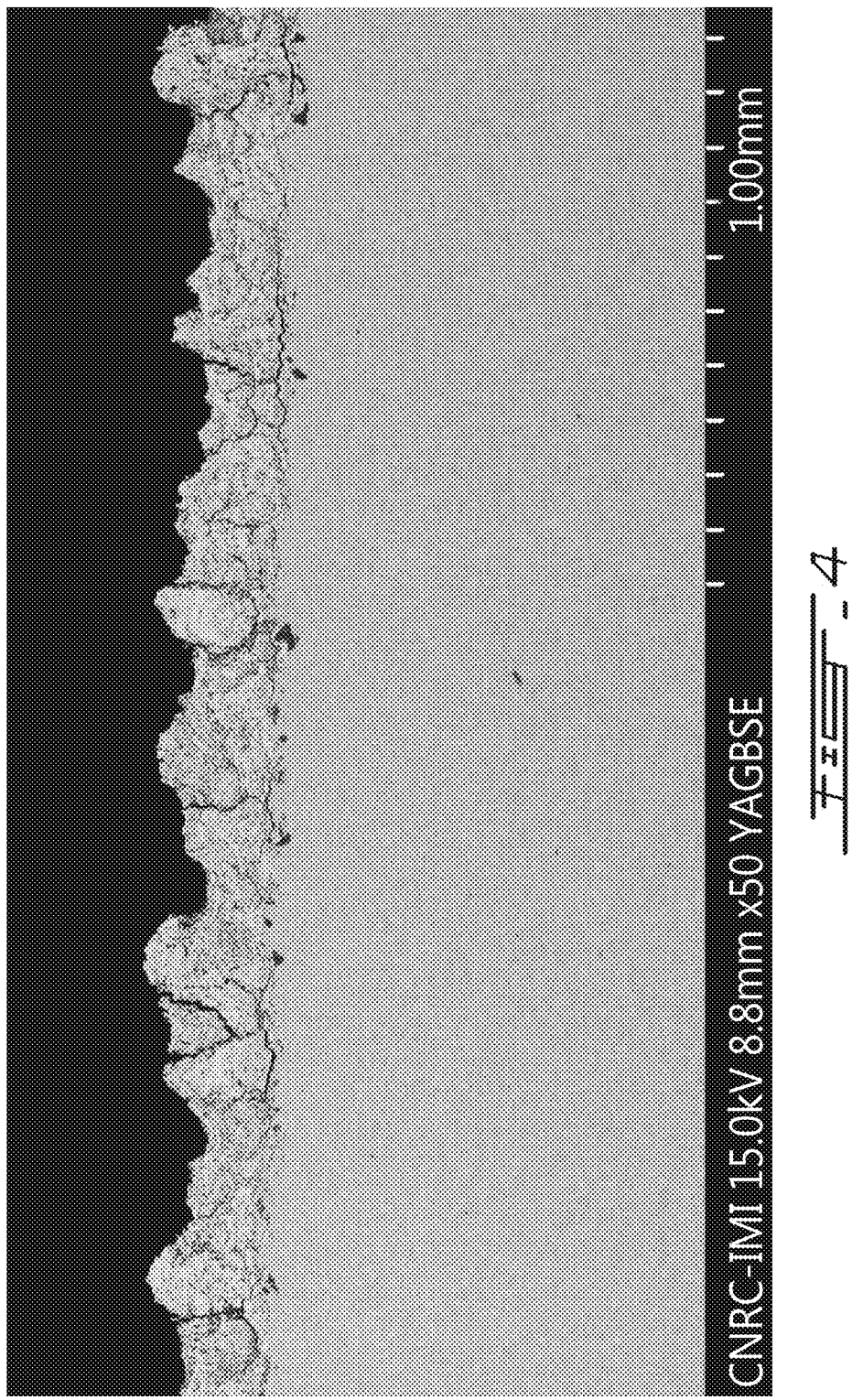
FIG. 4 shows a cross-sectional microstructural view of an YSZ coating produced with a YSZ powder using a system according to the present invention.

The bottom side of the powder container 110 comprises a sieve 150 positioned directly on top of, and secured to, a guide 160, securely fastened to the base (B) of the reservoir 100. The sieve 150 and the guide 160 may be easily dismounted, using a slot and pin connection 170 best seen in FIG. 2B for example, for cleaning between different powders for example. There is no gap between the bottom of the sieve 150 and the top of the guide 160, as best seen in FIG. 2.

Sieves 150 of mesh sizes 20×20, 40×40, 60×60, 80×80, 100×100 and 200×200 were used, depending of the fluidity of the bulk powder, finer meshes being used for fluider bulk powders. The fluidity of a powder depends on the nature of its material, its particle size and size distribution, its geometry and its humidity rate.

A powder outlet 200 is provided at the bottom of the guide 160, for discharging powders fluidized by the system into applicators such as coating and spray forming nozzles and guns as known in the art.

A vibrator 18, of a frequency in the range between 1 and 5 KHz, 3 KHz for example, and a linear force of about 300 N for example, is connected to the powder reservoir 100. The vibrator 18 generates vibrations transmitted to the whole powder container 110, i.e. to the powder within the powder container 110, above the hopper/sieve assembly. It has been found that vibrating the powder within the powder container 110 allows fluidizing the powder into the flow of inert gas coming through the inert gas entry port 15, so that the powder assumes fluidity and passes through the sieve 150 in a uniform, consistent powder flow.

In the case of bulk powders with very fine median particles size, i.e. particles with size less than about 1 μm, the action of the stir spindle 120 is sufficient to dispense controlled amounts of powder through the sieve 150, for use typically in plasma spray applications for example.

In case of bulk powders of median particles size above 1 μm, a brush 140 may be further provided at the end of the axial shaft 130, in contact with the upper surface of the sieve 150, for assisting in dispensing controlled amounts of the powder through the sieve 150 by forcing the powder through the sieve 150 at a very low speed, as controlled by the motor 16, directly into the guide 160.

In use, bulk powder, of a particle size comprised in a range between about 0.1 and about 100 micrometers, is added within the powder reservoir 100 by opening the pressure vessel 10 and inserting the powder within the powder container 110.

The system further comprises a flow control unit, including pressure sensors for diagnostic and control as well as gas shutoff valves, maintaining a constant inert gas feed rate. A rupture disk is mounted on the pressure vessel 10 for security purposes and for compliance with ASME section VIII division I North-American standard.

The inert gas provided within the pressure vessel 10 through the entry port 15 prevents oxidation of the powder, and carry the powder as known in the art.

During operation, the system is maintained at a pressure higher than the pressure of the main stream of the cold spray/plasma equipment in which the powder is being introduced when exiting the powder outlet 200. A pressure differential about 0.5 bars insures a consistent powder flow rate and to prevent the powder from backing up within the system. The system can be adjusted to a wide range of pressure settings up to but not to exceed 131 bars.

Calibration of the system is achieved through monitoring the feed rate of the powder by using a weight measurement system or other means to establish a reference. Once this reference has been established, a corresponding set of parameters is then determined in terms of speed of the motor 16, vibrator frequency and inert gas flow rate. Those parameters are fully adjustable to accommodate varying needs.

For example, for AlSi (S-10) powders, the rotation of the motor 16 may be set to 2.5 Rpm, the vibrator to about 3 KHz, the inert gas flow rate to about 100 slpm (standard liter per minute) for a feeding rate of 60 g/min.

For a mixture of Ti powder (Raymor of grade 1: 0 μm-45 μm) and aluminum powder (Valimet H-15), the rotation of the motor 16 may be set to 5 Rpm, the vibrator to about 3 KHz, the inert gas flow rate to about 10 slpm for a feeding rate of 38 g/min.

The fluidized powder thus discharges into the guide 160.

The present system may be used for depositing thermal barrier coating. For example, a suspension plasma spray (SPS)-like $ZrO_2$—$Y_2O_3$ (YSZ) coatings was produced using a system according to an embodiment of the present invention. The use of YSZ as one of the layers of a thermal barrier coating (TBC) system is a well-established technology in gas turbines engines for aerospace and energy generation applications. YSZ is a ceramic material that has a high melting point (~2700° C.). It exhibits an excellent thermo-mechanical performance in the hot zones of turbine engines (combustion chamber, blades and vanes) to protect the underlying metallic parts against high temperature exposure.

Typically YSZ coatings are applied via air plasma spray (APS) or electron-beam physical vapor deposition (EB-PVD). One of the major advantages of the EB-PVD system over the APS system relies on the fact that EB-PVD YSZ coatings exhibit vertical columnar microstructure in relation to the substrate surface. At high temperatures, due to thermal expansion and creep of the metallic substrate, the columnar structure of the coating act as a stress relief, thereby accommodating it to the stresses and increasing the lifetime of the coating. The drawback to the EB-PVD technology is related to its high cost.

Lately, there has been a huge effort to develop YSZ via suspension plasma spray (SPS) to replace EB-PVD systems. YSZ coatings deposited via SPS also exhibit a vertical columnar structure, which enables stress relief upon thermal expansion and creep. Typically, for conventional APS, the feedstock particle size distribution is generally found within a range from 10 to 100 μm in diameter. For SPS coatings, the typical feedstock particle consists of loosely agglomerated clusters of nano and/or sub-micron particles. These particles can be fed using regular powder feeders for thermal spraying, where a gas, such as Ar or $N_2$ for example, is employed to carry the particles to the APS torch. These particles tend to form fine agglomerates that tend to clog the powder hoses. Therefore, to compensate this clogging issue, these particles are put in a colloidal suspension, typically based in alcohol, and fed into the plasma torch. The preparation of suspensions involves extra time and cost in the production line.

By using the powder fluidizing system of the present invention, it was possible to spray a YSZ powder (40390N-8601, Inframat Corp., Manchester, Conn., USA) typically employed in SPS for thermal barrier coatings (TBCs). According to the manufacturer, this powder exhibits an average primary particle size of 30-69 nm, a $d_{50}$ of ~0.5 μm (clusters) and a surface are of 15-40 $m^2/g$.

This powder was deposited by using an APS torch (Axial III, Northwest Mettech Corp., North Vancouver, BC, Canada) and a powder feeder of the present invention. No suspensions were necessary. The powder carrier gas was Ar.

FIG. 4 shows the overall microstructure of this coating (cross-section view). It is possible to distinguish the vertical columnar structure parallel to the substrate surface. This type of structure is sought when SPS YSZ coatings are engineered to be employed as TBCs in turbine engines.

The present system may be used for thin layers. For example, FIGS. **5*b*, 6*b*, 7*b* and 8*b*** show coating micrographs obtained with cold spray fed using a system of the present invention, with powders (FIGS. 5a, 6a, 7a and 8a) that were not feedable with conventional feeders.

Figure 5A:
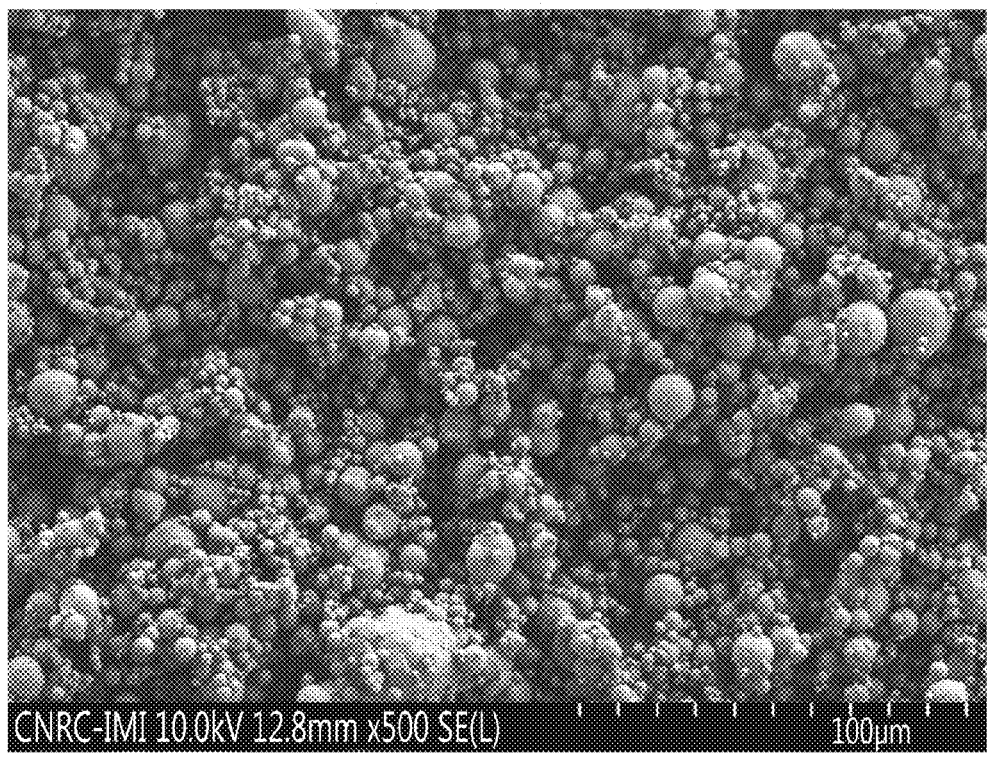
FIG. 5 show a) a micrograph of a zinc powder (Alfa-Aesar 97.5% zinc) with median particle size between 6 and 9 μm, and b) a cross-sectional microstructural view of a coating obtained by cold spraying the powder of FIG. 5a, using a system according to the present invention.
Figure 5B:
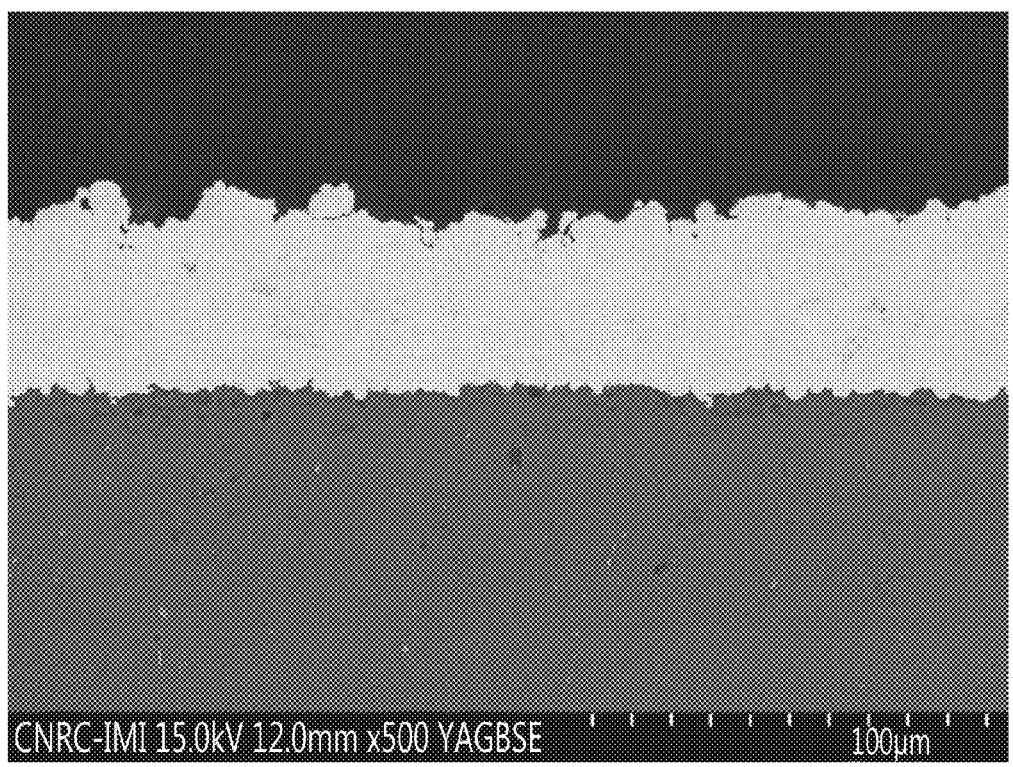

FIG. 5a shows a zinc powder with median particle size between 6 and 9 μm. This powder could not be fed in a conventional volumetric powder feeder such as a CGT (Cold Gas Technology GmbH) powder feeder, the powder not flowing through the wheel. FIG. 5b shows a zinc coating produced via cold spray using the present system.

Figure 6A:
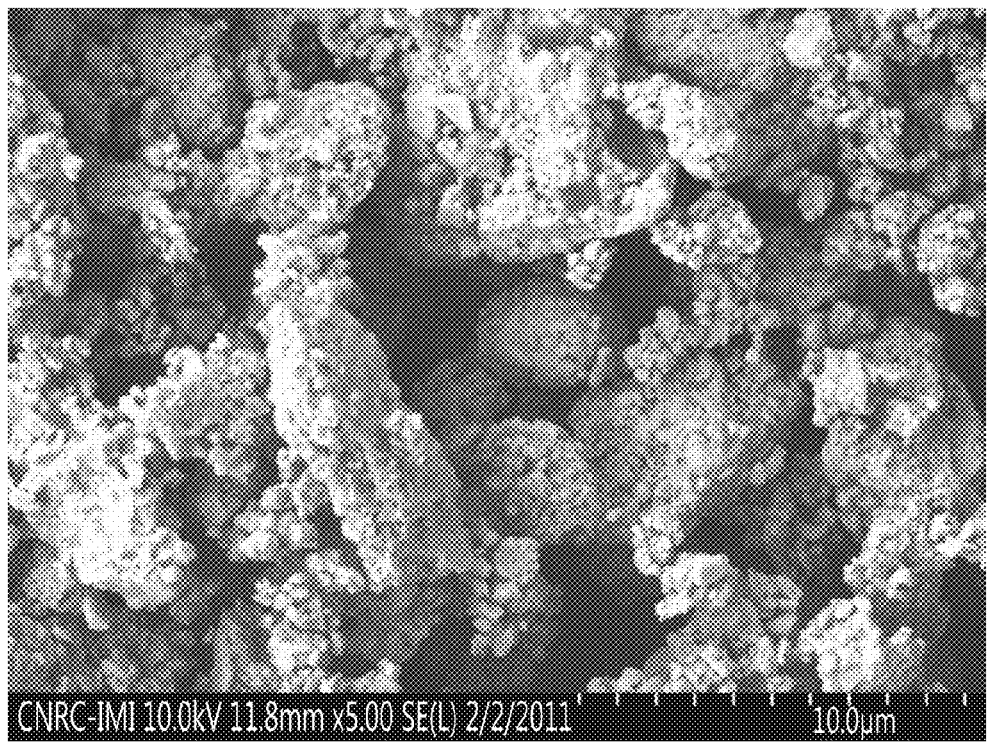
FIG. 6 show a) a micrograph of a WC—Co powder (Fujimi powder #DTS-W752-7/2) of median particle size 6 μm, and b) a cross-sectional microstructural view of a coating obtained by cold spraying the powder of FIG. 6a, using a system according to the present invention.
Figure 6B:
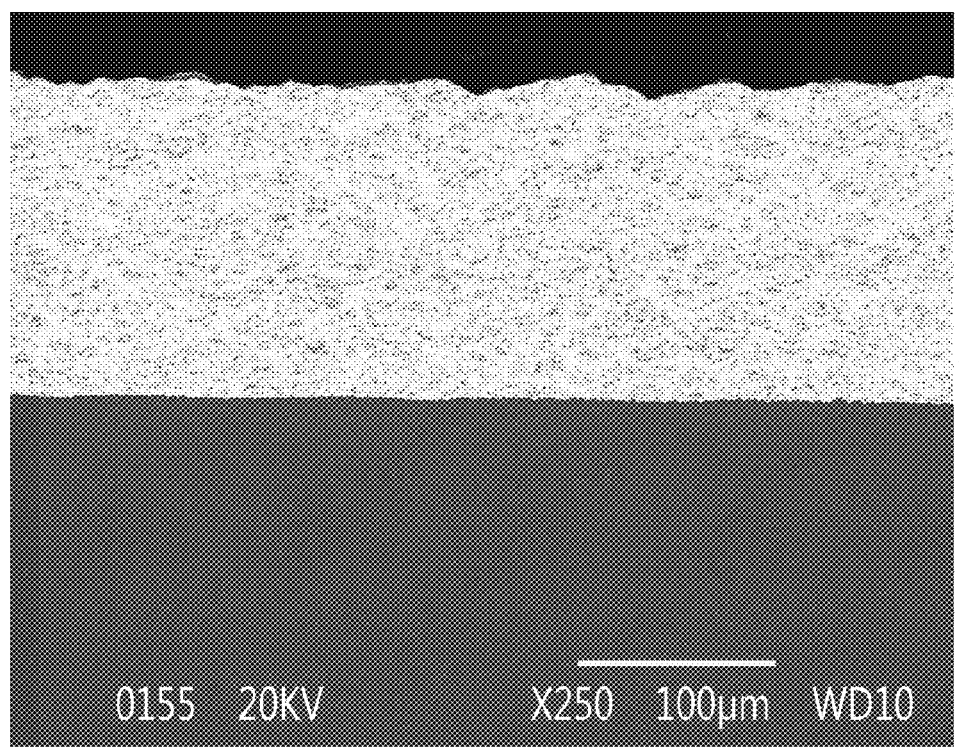

FIG. 6a shows a WC—Co powder (Fujimi powder #DTS-W752-7/2) of median particle size 6 μm, which could not be fed in a conventional volumetric powder feeder such as CGT or Plasma Giken powder feeders, the powder not flowing in the feeders. FIG. 6b shows a coating produced with the WC—Co powder using the present system.

Figure 7B:
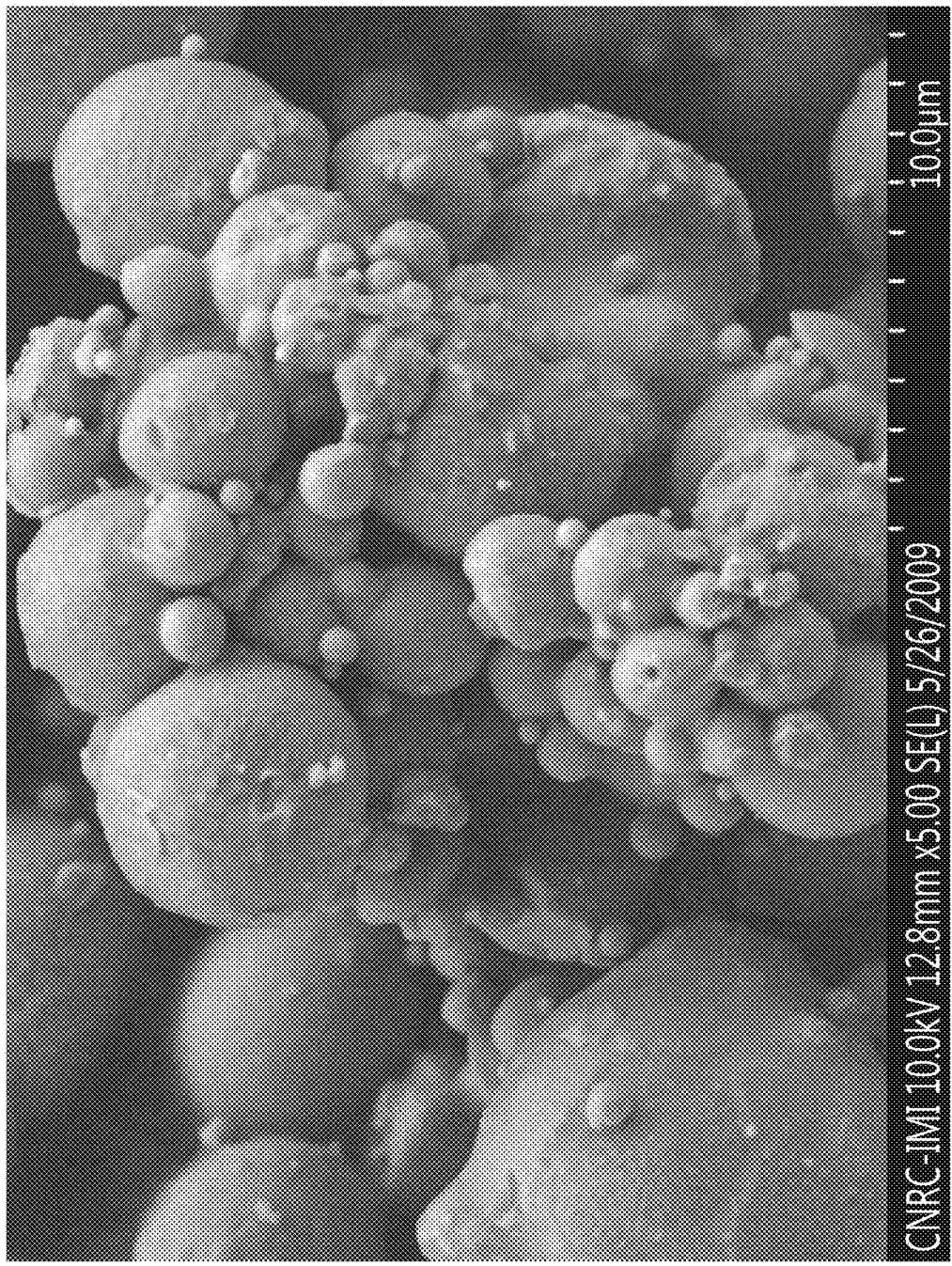
FIG. 7 show a) a micrograph of a low melting point Cu alloy powder, of powder median particle size 24 μm, and b) a cross-sectional microstructural view of a coating obtained by cold spraying the powder of FIG. 7a, using a system according to the present invention.
Figure 7B:
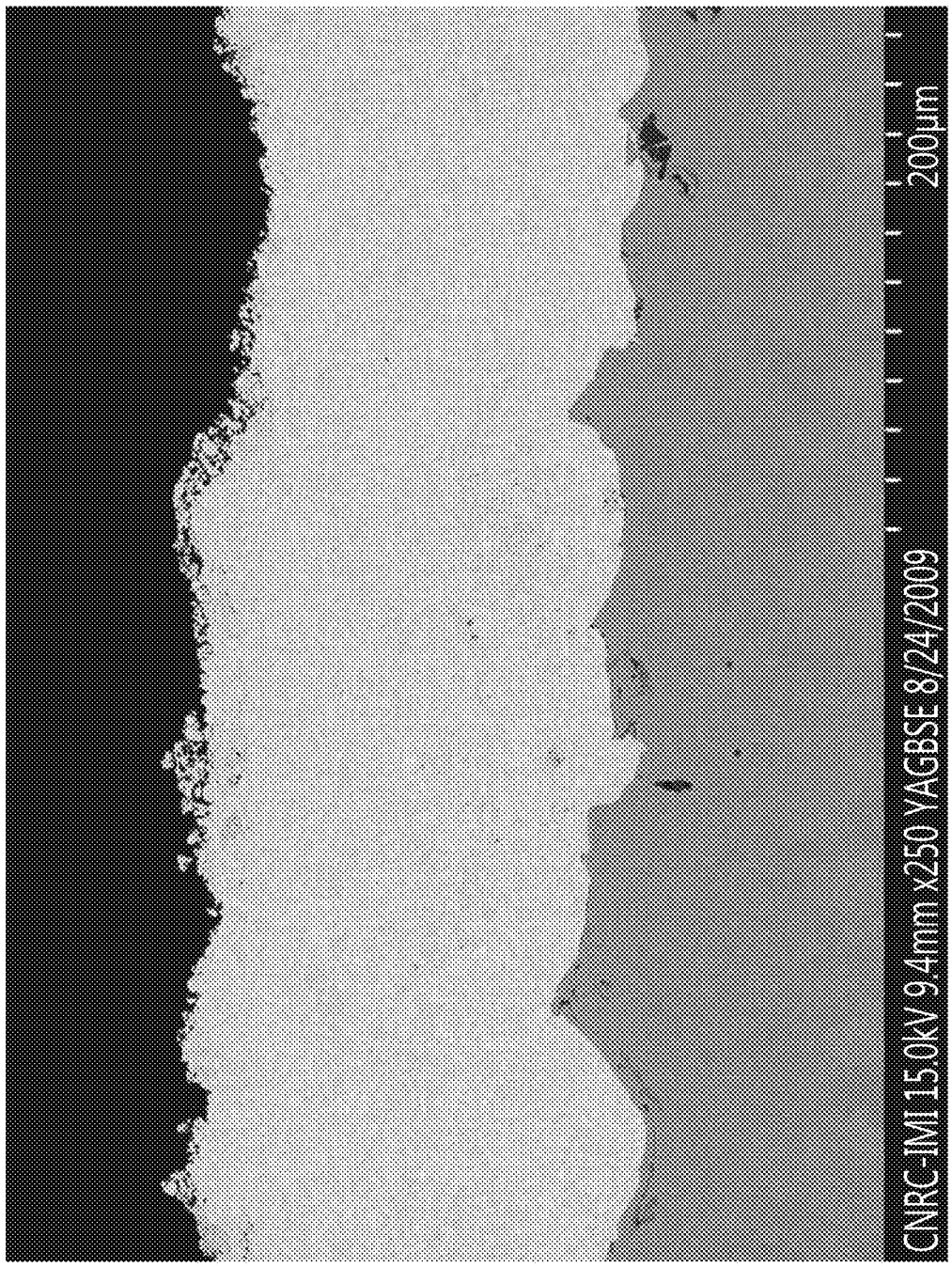

FIG. 7a shows a low melting point Cu alloy powder, of powder median particle size 24 μm, which could not be fed in a conventional volumetric powder feeder such as CGT or Plasma Giken powder feeders, because the powder clogged the volumetric powder feeder in the first few seconds of operation. FIG. 7b shows a low melting point Cu alloy coating produced via cold spray using the present system.

Figure 8A:
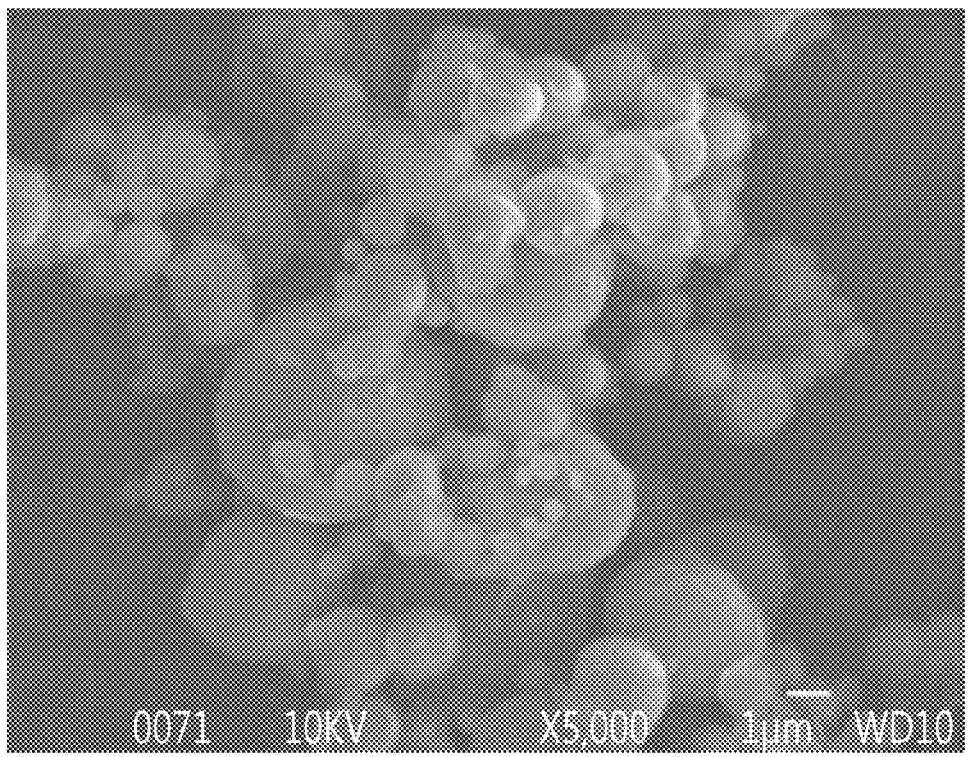
FIG. 8 show a) a micrograph of a CP-Aluminum powder (Valimet H-3), of powder median particle size 4 μm, and b) a cross-sectional microstructural view of a coating obtained by cold spraying the powder of FIG. 8a, using a system according to the present invention.
Figure 8B:
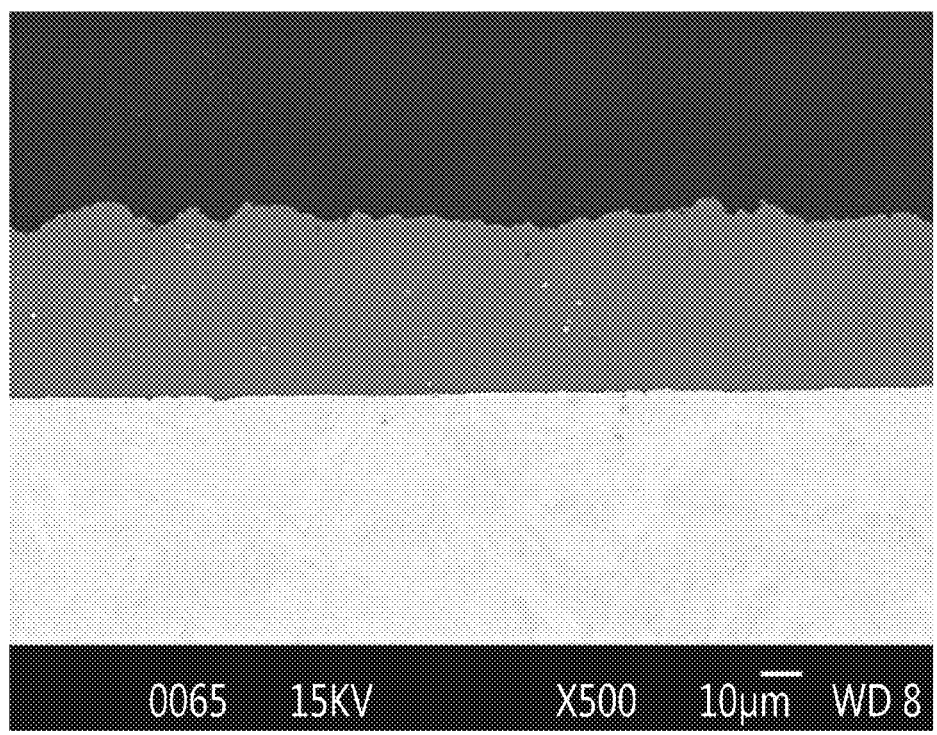

FIG. 8a shows a CP-Aluminum powder (Valimet H-3), of powder median particle size 4 μm, which could not be fed in a conventional volumetric powder feeder feeder, such as CGT or Plasma Giken or Inovati powder feeders, because the powder clogged the powder feeder in the first few seconds of operation. FIG. 8b shows a thin CP-Aluminium coating produced via cold spray using the present system.

Figure 9B:
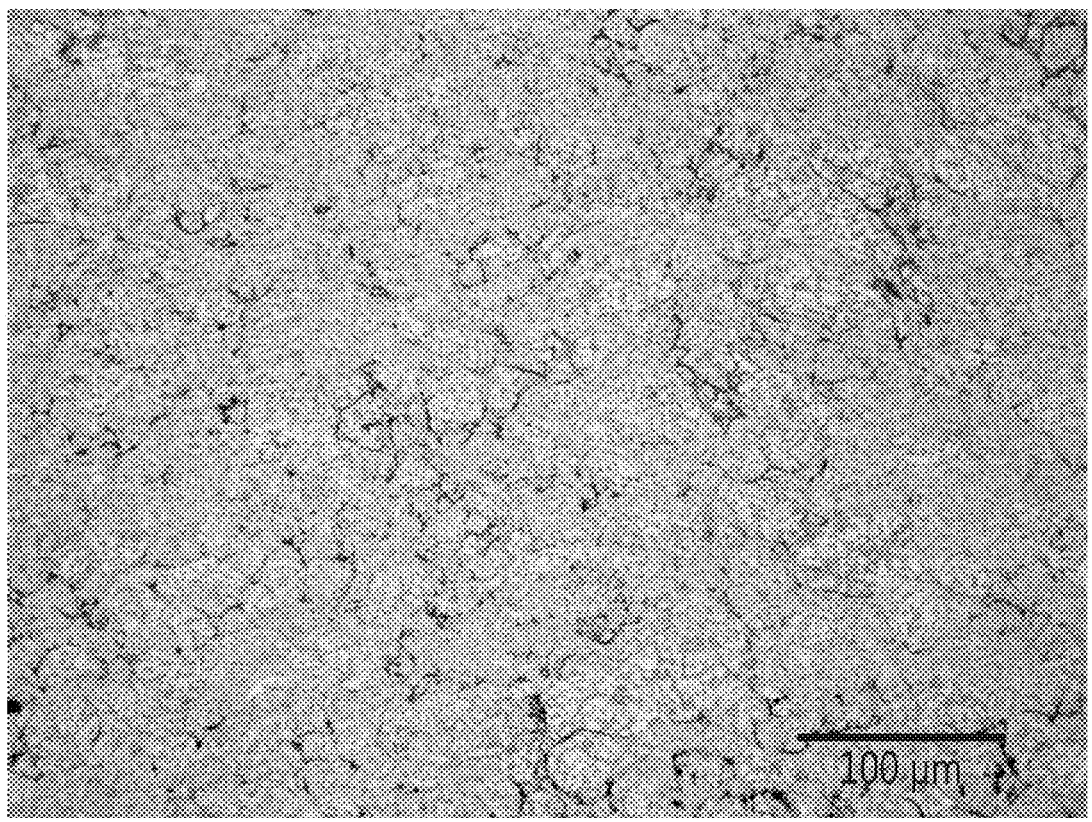
FIG. 9 show a) a micrograph of a spherical Aluminium Silicon powder (Valimet S-10) of powder median particle size of 23 μm, and b) a cross-sectional microstructural view of a coating obtained by cold spraying the powder of FIG. 9a, using a system according to the present invention.

FIG. 9a shows a spherical Aluminium powder (Valimet S-10) of powder median particle size of 23 μm, which has a limited feed rate in a conventional volumetric powder feeder such as CGT powder feeders, because the powder compacts when increasing the bulk powder feeding rate. FIG. 9b shows a thin CP-Aluminium coating produced via cold spray using the present system.

The present system allows controlling and adjusting the powder discharge rate at the powder outlet 200 at a controlled rate throughout a wide distribution range. The powder discharge rate is determined by the mesh dimension of the sieve 150, the geometry and size of the bulk powder being fed, the rotation speed of the motor 16, the frequency of the vibration and the carrier gas flowrate.

The powder feed rate depends primarily of the mesh dimension of sieve 150. For example, for Valimet S-10 powder a 60×60 mesh is used.

For a given mesh, the gas flow rate, the rotation speed and the vibration parameters allow changing the powder feed rate more precisely and insuring a constant flow.

The present invention provides a powder feeder method and system that allows continuous and uniform feeding of powders of a particle size between 0.1 and 100 μm, and having different particle-size distribution and geometries, under pressures of up to 131 bars.

As people in the art will appreciate, the present system comprising a powder reservoir easily inserted within, and removed from, a pressure vessel is easily cleaned from one type of powder to another.

The present system, as an autonomous progressive scanning rotative powder feeder, allows continuous and uniform feeding of powder of a size between 0.1 and 100 micrometers, to a process such as cold spray, HVOF for example, for example, feeding materials having different particle-size distribution and geometries, typically of a dimension less that 5 micrometers for high velocity oxygen fuel spray processes (HVOF) without requiring suspensions, or in the range between 0.1 and 100 micrometers for cold sprayers, or plasma spray applications. The system operates under pressures of up to 131 bars.

The present powder feeder method and system may be used in fine powder and/or high pressure applications for production of spray coatings suitable for example.

For cold coating, use of this fine powder feeder opens the door to different applications requiring thinner coatings than those currently carried out by cold spraying. This includes increasing the number of applications in aerospace and energy sectors but also in other industries such as electronics, automotive & photovoltaics for example.

For high velocity oxygen fuel spray processes (HVOF) or plasma spray applications, powder of submicron size without resorting to suspensions enables productivity gains as the preparation of suspension by traditional method to require extensive time, much more control parameters and clogging problem are very common. In addition, the present system and method allow bypassing the buoyancy problems of some powders and reduces the production costs of protective or functional coatings by increasing the deposition rate of these powders to values traditionally obtained with plasma spray.

The scope of the claims should not be limited by the embodiments set forth in the examples, but should be given the broadest interpretation consistent with the description as a whole.

The invention claimed is:

1. A powder fluidizing method, comprising:
   feeding a bulk powder within a powder reservoir maintained under a pressure of up to 131 bars, the bulk powder having a particle size comprised in a range between 0.1 and about 100 micrometers;
   vibrating the whole powder reservoir, with the powder maintained under pressure therein;
   discharging the thus fluidized powder through a sieve positioned at the bottom of the powder reservoir to a guide leading to a powder outlet, the method comprising maintaining a pressure differential between the powder reservoir and the powder outlet of about 0.5 bars.

2. The method of claim 1, wherein said vibrating the powder reservoir comprises using vibrations in a range between 1 and 5 KHz.

3. The method of claim 1, further comprising passing the powder through a sieve positioned at the bottom of the powder reservoir and sweeping the powder through the sieve using a brush axially mounted in rotation within the powder reservoir.

4. The method of claim 1, further comprising injecting a carrier gas into the powder reservoir.

5. The method of claim 1, further comprising stirring the powder within the powder reservoir by at least one spindle.

6. The method of claim 1, further comprising stirring the powder within the powder reservoir by a plurality of stir spindles mounted at a different height on an axial shaft within the powder reservoir.

7. The method of claim 1, further comprising stirring the powder within the powder reservoir by a plurality of stir spindles mounted at a different height on an axial shaft within the powder reservoir and having different orientations.

8. The method of claim 1, further comprising discharging the powder passed through a sieve positioned at the bottom of the powder reservoir to an applicator.

9. The method of claim 1, further comprising discharging the powder passed through a sieve positioned at the bottom of the powder reservoir to an applicator, the method comprising maintaining the powder reservoir at a pressure higher than a pressure in the applicator.

10. The method of claim 1, further comprising injecting a carrier gas into the powder reservoir and stirring the powder within the powder reservoir by at least one spindle, said method comprising selecting a rotation speed of the stir spindle, a frequency of the vibration and a flow rate of the carrier gas in relation to a bulk powder feeding rate.

11. A powder fluidizing system, comprising:
- a pressure vessel;
- a powder container removably mounted, and maintained under a pressure of up to 131 bars, within said pressure vessel, and comprising a bottom sieve; and
- a vibrator connected to said powder container, said vibrator causing said powder container to vibrate as a whole above said sieve;
- wherein a bulk powder of particle size comprised in a range between 0.1 and about 100 micrometers fed within said powder container maintained under pressure is fluidized within said powder container by the vibrations above said sieve, and flows through said sieve.

12. The system of claim 11, wherein said powder container further comprises at least one stir spindle, axially mounted in rotation within said powder container.

13. The system of claim 11, wherein said powder container further comprises a plurality of stir spindles, axially mounted in rotation at different heights within said powder container.

14. The system of claim 11, wherein said powder container further comprises a plurality of stir spindles, axially mounted in rotation, at different heights and with different orientations, within said powder container.

15. The system of claim 11, wherein said powder container further comprises a brush, said brush being axially mounted in rotation within the powder reservoir, and said brush sweeping the powder through the sieve.

16. The system of claim 11, wherein said pressure vessel comprises a carrier gas inlet.

17. The system of claim 11, comprising a powder discharge outlet.

* * * * *